United States Patent [19]
Grierson et al.

[11] 3,826,935
[45] July 30, 1974

[54] MOTOR HOUSING CONSTRUCTION FOR A VACUUM CLEANER WITH STRAIN-RELIEF FOR MOTOR LEADS

[75] Inventors: Keith J. Grierson, Roseville; Bruce E. Samuelson, St. Paul, both of Minn.

[73] Assignee: Whirlpool Corporation, Benton Harbor, Mich.

[22] Filed: Sept. 12, 1972

[21] Appl. No.: 288,378

[52] U.S. Cl. ............... 310/71, 174/153, 310/43, 310/89, 310/239
[51] Int. Cl. ...... H02k 5/14, H02k 5/22, H01b 17/26
[58] Field of Search ....... 310/50, 71, 42, 43, 85–90, 310/246–248, 93, 239, 242, 89; 174/135, 136, 153; 339/61

[56] References Cited
UNITED STATES PATENTS

| | | | |
|---|---|---|---|
| 2,246,270 | 6/1941 | Staak | 310/247 |
| 2,707,623 | 5/1955 | Schwaneke | 310/71 X |
| 3,313,966 | 4/1967 | Kasajima | 310/239 |
| 3,483,408 | 12/1969 | Frohmuller et al. | 310/71 |
| 3,487,200 | 12/1969 | Waller et al. | 174/135 X |

*Primary Examiner*—J. D. Miller
*Assistant Examiner*—Robert J. Hickey
*Attorney, Agent, or Firm*—Hofgren, Wegner, Allen, Stellman & McCord

[57] ABSTRACT

A motor construction for use such as in a vacuum cleaner or a vacuum cleaner attachment, wherein the motor housing is split to define a pair of housing halves which, when secured together, effect an enclosure for the motor, a strain relief for the motor leads, means for mounting the motor brushes, and means for supporting and positioning the armature and field assemblies.

11 Claims, 5 Drawing Figures

PATENTED JUL 30 1974 3,826,935

MOTOR HOUSING CONSTRUCTION FOR A VACUUM CLEANER WITH STRAIN-RELIEF FOR MOTOR LEADS

BACKGROUND OF THE INVENTION

1. Field of the Invention

This invention relates to electric motors and in particular to housings for electric motors.

2. Description of the Prior Art

It is conventional in electrical lead structures to provide a grommet or bushing for effecting a strain relief connection of a lead wire to avoid straining the electrical connection of the lead wire to the electrical connector means of the device. Examples of such elements are shown in U.S. letters Pat. Nos: 107,993 Yale, Electromagnetic Safe Lock 1,599,558 Diehl, Insulating Block 2,424,758 Klumpp, Jr., Strain-Relief Bushing 2,424,759 Klumpp, Jr., Strain-Relief Bushing 2,563,604 Hultgren, Strain-Relief Bushing 2,895,003 Rapata, Strain Relief Grommet 2,920,129 Rapata, Strain Relief Grommet 3,624,270 Turner, Connecting Apparatus for Terminating Electrical Conductors.

Such strain relief means may be provided in accordance with requirements of the Underwriters Laboratories to establish safe operating conditions in such electrical devices.

In the prior art devices, means must be provided for mounting the grommet or bushing to the device and, thus, the provision of such strain relief means effects an increase in the cost of the device both as to the cost of the strain relief element itself and the cost of mounting it in the device.

SUMMARY OF THE INVENTION

The present invention comprehends an improved motor structure wherein the housing effectively defines a strain relief means eleminating the need for any additional bushing, grommet, or the like, and facilitating the assembly and maintenance of the electrical motor.

More specifically, the present invention comprehends the provision in an electrical motor having electrically energizeable windings, and insulated wire leads for providing electrical power to the windings, of a housing enclosing the motor having separate portions fixedly juxtaposed to define a tortuous path with the leads extending therethrough, the leads being crimped by the housing portions to define a strain relief mechanical securing of the leads to the housing.

The housing strain relief portions are preferably formed of an electrical insulating material such as a suitable plastic material as will appear hereinafter.

The housing may further include means integral therewith comprising a brush holder socket, and a commutator brush removably received in the socket.

Still further, the motor may include an armature assembly and a field assembly and the housing may further define second separate portions defining means for supporting at least one of the assemblies in the motor. In the illustrated embodiment, the second separate portions comprise inwardly projecting ribs formed integrally with the housing. Thus, the electrical motor structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
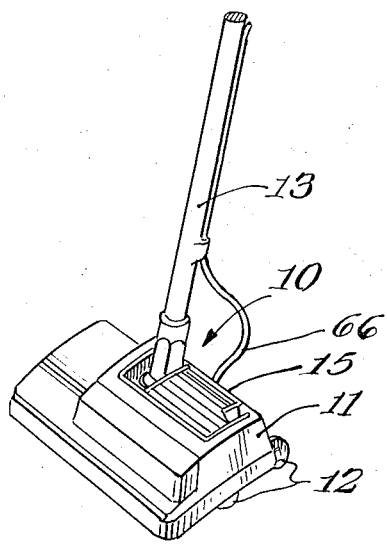
FIG. 1 is a fragmentary perspective view of a vacuum cleaner provided with an electrical motor structure embodying the invention.
Figure 5:
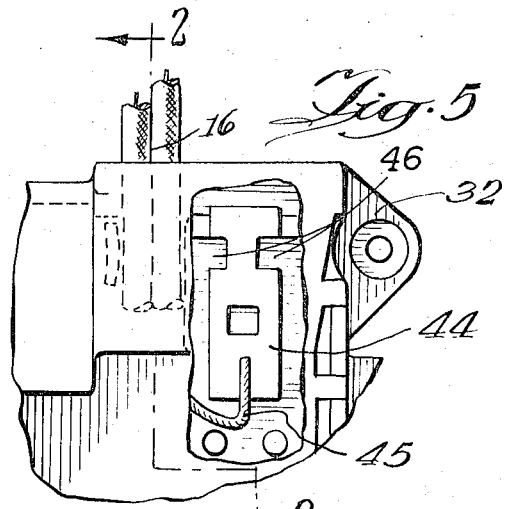
FIG. 5 is a fragmentary enlarged transverse section illustrating the brush assembly.

In the exemplary embodiment of the invention as disclosed in the drawing, a vacuum cleaner unit generally designated 10 is shown in the form of a rug cleaning attachment for a canister vacuum cleaner and includes a nozzle 11 carried on suitable wheels 12, and hollow operating handle 13 connected to a source of suction (not shown) for moving the vacuum cleaner over the surface to be cleaned. The vacuum cleaner 10 includes a rotating brush member (not shown) which is operated by an electric motor generally designated 14 mounted within a raised portion 15 of the nozzle 11 and is electrically energized by means of a power supply lead 66 which may be connected via handle 13 and the source of suction to a suitable power supply (not shown), such as a conventional outlet receptacle. The source of suction (not shown) may advantageously take the form of a conventional canister vacuum cleaner unit.

Motor 14 includes a motor power supply lead 16, a field assembly 17, an armature assembly 18, a brush assembly 19, and a housing generally designated 20 for enclosing the motor. Motor power supply lead 16 may include two conductors as will appear, and is electrically connected by a connector (not shown) to power supply lead 66. Armature 18 is rotatably supported by means of bearings 21 and 22 mounted in suitable bearing support portions 23 and 24 of the housing and journalling opposed shaft portions 25 and 26 extending coaxially from opposite ends of the armature 18, as illustrated in FIG. 4.

Figure 4:
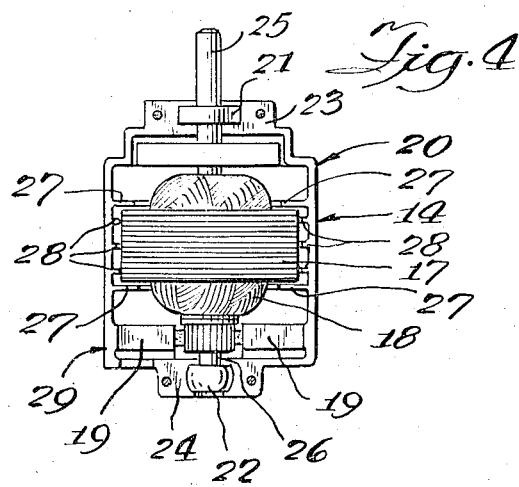
FIG. 4 is a diametric section of the motor taken substantially along the line 4—4 of FIG. 3.

As further shown in FIG. 4, the housing defines a plurality of ribs 27 for positioning the stator or field assembly 17 and a plurality of ribs 28 for supporting the field assembly 17. In the illustrated embodiment, housing 20 is formed of an electrical insulating material, such as a synthetic plastic, and illustratively, the housing may be formed of a polycarbonate material, such as LEXAN 500, a polycarbonate plastic manufactured by General Electric Co. Ribs 27 and 28 may be molded integrally with the shell portion 29, and as shown in FIG. 4, bearing support portions 23 and 24 may also be molded integrally therewith.

Figure 2:
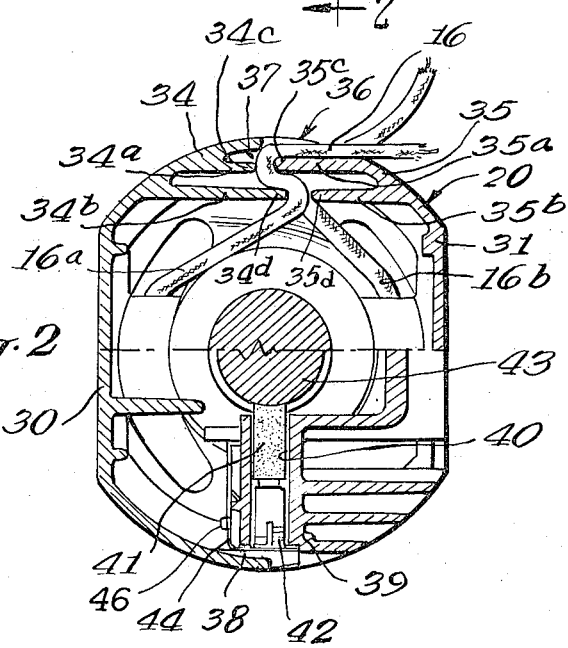
FIG. 2 is a transverse section of the electrical motor showing the split housing taken substantially along the line 2—2 of FIG. 5.
Figure 3:
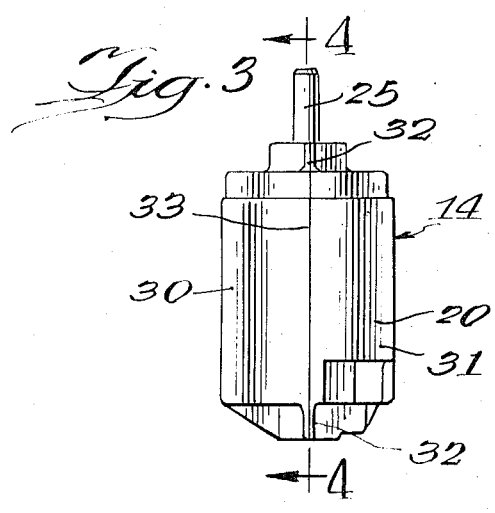
FIG. 3 is a reduced plan view of the motor.

As best seen in FIGS. 2 and 3, the housing 20 comprises a split housing defining a first half 30 and a second half 31 which are secured together by mechanically staking as at a plurality of securing portions 32 to define the complete enclosure with portions 30 and 31 abutting along the split plane 33 as shown in FIG. 3.

As illustrated in FIG. 2, housing halves 30 and 31 further define a pair of apposed portions 34 and 35 defining a strain relief generally designated 36 provided by the mating of the two halves for retaining the motor power supply lead 16 against axial or pulling forces applied to lead 16. Housing portions 34 and 35 are fixedly juxtaposed in the assembled arrangement of the housing to define a tortuous path generally designated 37 with the lead 16 extending through the path and being crimped against movement by the housing portions 34 and 35 to mechanically secure the lead to the housing against axial or longitudinal displacement. Portions 34 and 35 define inturned walls 34a, 34b, 35a and 35b. Wall 34a defines a thin tip 34c which is spaced from the tip 35c of wall 35a a distance approximately equal to the diameter of the insulated wire lead 16 in its unconstricted condition to define a mechanical interlock with the wire lead insulation resisting longitudinal movement of the wire. Similarly, tip 34d of wall 34b is spaced from tip 35d of wall 35b a distance approximately equal to the unconstructed thickness of the insulation covered wire lead 16 to define a second mechanical interlock resisting longitudinal movement of the wire therepast. The arrangement of the wall tips 34c, 35c, 34d and 35d is offset to define a zig-zag path 37, as shown in FIG. 2. The walls 34a and 35a and 34b and 35b illustratively are formed integrally with the housing and are formed of electrically insulating material to effectively avoid short-circuiting of the lead even in the event of a penetration of the insulation in the strain relief action as when a severe pulling force is applied to the leads. The routing of the lead 16 in zig-zag path 37 introduces substantial frictional resistance to any movement of lead 16 which might be caused by pulling on the lead.

Internally of the housing, the lead 16 may be divided into a plurality of leads 16a and 16b, as shown in FIG. 2.

As illustrated in FIG. 2, housing portion 31 further defines a pair of simplified brush holder assemblies 19 each including a brush holder socket 40 which is integral with housing portion 31 for receiving the commutator brush 41 and a biasing spring 42 for urging the brush against the commutator 43 of the motor 14. A clip 44 is secured to the housing portion 39 by ears 46 on housing portion 30 and a tab 38 at the outer end of the socket to serve both as the electrical connection to the brush leads 45 and as the means for retaining the brush 41 and coil spring 42 in the socket 40. The housing portion 39, and the adjacent portion of the shell of the housing are formed of an electrical insulating material, such as insulating plastic, and insulate the clip in the assembled arrangement of the motor.

As a result of the provision of the motor housing as a split housing parted on the motor's axial line as at 33, all of the components of the motor may be assembled within one housing half 31 and the assembly completed by securing the other housing half 30 which, in effect, forms a cover for housing half 31, in place by a mechanical staking operation as indicated above. By forming the housing of an electrically insulating material, insulating elements, such as bushings, insulating strips, etc., conventionally used in motor construction, are eliminated. Further, by utilization of the positioning and support ribs 27 and 28 integral with the housing, positioning and support elements previously required in the motors of the prior art are eliminated. Thus, the motor construction of the present invention is extremely simple and economical while yet providing improved strain relief brush mounting and armature and field assembly mounting motor structures as discussed above.

The foregoing disclosure of specific embodiments is illustrative of the broad inventive concepts comprehended by the invention.

We claim:

1. In an electrical motor having electrically energizeable windings, and an insulated wire lead for providing electrical power to said windings, a housing enclosing the motor having separate portions fixedly juxtaposed to define a tortuous path with said lead extending therethrough, said lead being crimped by said housing portions to define a strain relief mechanical securing of the lead to the housing, said motor housing portions cooperatively defining an outer pair of shoulders spaced apart a distance approximately equal to the unconstricted thickness of said wire lead, and an inner pair of shoulders spaced apart a distance approximately equal to the unconstructed thickness of said wire lead and offset laterally from said outer pair of shoulders, said shoulders cooperatively clamping said wire lead in a zig-zag configuration.

2. The electrical motor structure of claim 1 wherein one of said shoulders comprises a thin projection for engaging the outer insulation of the wire lead to define a mechanical interlock against longitudinal movement of the wire therepast.

3. The electrical motor structure of claim 1 wherein one of said shoulders of each pair comprises a thin projection for deformably engaging the outer insulation of the wire lead to define a mechanical interlock against longitudinal movement of the wire therepast.

4. The electrical motor structure of claim 1 wherein said shoulders comprise the distal ends of pairs of wall portions of the housing extending flatwise toward each other.

5. The electrical motor structure of claim 4 wherein said housing is formed of electrically insulating material and further includes an integral portion defining an insulative brush holder socket, said motor further including a commutator brush removably received directly in said insulative socket.

6. The electrical motor structure of claim 5 wherein a clip is secured to the housing and retains said brush in said socket, said clip further defining an electrical connection to said brush.

7. The electrical motor structure of claim 5 wherein said electrical insulating material comprises synthetic plastic material.

8. In an electrical motor having electrically energizably windings, and an insulated wire lead for providing electrical power to said windings, a housing enclosing the motor having separate portions fixedly juxtaposed to define a tortuous path with said lead extending therethrough, said lead being crimped by said housing portions to define a strain relief mechanical securing of the lead to the housing, said motor housing portions cooperatively defining an outer pair of shoulders spaced apart a distance approximately equal to the unconstricted thickness of said wire lead, and an inner pair of shoulders spaced apart a distance approximately equal to the unconstructed thickness of said wire lead and offset laterally from said outer pair of shoulders, said shoulders cooperatively clamping said wire lead in a zig-zag configuration, said motor having an armature assembly and a field assembly and said housing further defining second portions defining means for supporting at least one of said assemblies of said motor.

9. The electrical motor structure of claim 8 wherein said supporting means comprises means for supporting said field assembly.

10. The electrical motor structure of claim 8 wherein said supporting means comprises inwardly projecting ribs formed integrally with said housing.

11. The electrical motor structure of claim 8 wherein said supporting means comprises inwardly projecting ribs formed of an electrically insulating material.

* * * * *